US008528005B2

(12) United States Patent
Andersson et al.

(10) Patent No.: US 8,528,005 B2
(45) Date of Patent: Sep. 3, 2013

(54) METHOD AND ARRANGEMENT IN AN IPTV TERMINAL

(75) Inventors: Ola Andersson, Spånga (SE); Niklas Fondberg, Enskede (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 268 days.

(21) Appl. No.: 12/878,434

(22) Filed: Sep. 9, 2010

(65) Prior Publication Data

US 2011/0252431 A1    Oct. 13, 2011

Related U.S. Application Data

(60) Provisional application No. 61/322,444, filed on Apr. 9, 2010.

(51) Int. Cl.
*G06F 9/44* (2006.01)

(52) U.S. Cl.
USPC .......................................... 719/318; 725/100

(58) Field of Classification Search
None
See application file for complete search history.

(56) References Cited

U.S. PATENT DOCUMENTS

| | | | |
|---|---|---|---|
| 5,696,697 A * | 12/1997 | Blau et al. .............................. 1/1 |
| 6,654,038 B1 | 11/2003 | Gajewska et al. |
| 7,483,944 B2 * | 1/2009 | Parupudi et al. ............... 709/203 |
| 7,962,011 B2 * | 6/2011 | Plourde et al. ................. 386/295 |
| 8,327,385 B2 * | 12/2012 | Hauser ........................... 719/318 |
| 2001/0047393 A1 * | 11/2001 | Arner et al. .................... 709/216 |
| 2002/0184608 A1 | 12/2002 | Pabla |
| 2006/0031918 A1 | 2/2006 | Sarachik et al. |
| 2006/0225107 A1 | 10/2006 | Seetharaman et al. |
| 2007/0061724 A1 | 3/2007 | Slothouber et al. |
| 2009/0217187 A1 | 8/2009 | Kendall et al. |
| 2009/0265607 A1 * | 10/2009 | Raz et al. ....................... 715/233 |
| 2010/0023884 A1 * | 1/2010 | Brichford et al. .............. 715/760 |
| 2010/0186022 A1 * | 7/2010 | Oulid-Aissa et al. .......... 719/318 |
| 2010/0325565 A1 | 12/2010 | Skinner et al. |
| 2012/0044138 A1 * | 2/2012 | Lee et al. ........................ 345/156 |

* cited by examiner

*Primary Examiner* — H S Sough
*Assistant Examiner* — Abdou Seye
(74) *Attorney, Agent, or Firm* — Coats and Bennett, P.L.L.C.

(57) ABSTRACT

A web engine configured for an ITF (IPTV Terminal Function), such as a STB (set-top-box), includes an application framework that enables display of applications. The application framework includes a memory for storing at least two applications, wherein the applications are arranged in a hierarchical tree structure in relation to each other. The application framework further includes an application manager. The application manager includes a receiving unit for receiving the event, e.g. a key press, and a controller for controlling the dispatching. The controller may include an event wrapper for wrapping and unwrapping the event and a dispatcher for transferring the wrapped event down through the application tree. For each application node including the root node, the application manager is configured to determine if an event should be processed by the current application.

9 Claims, 10 Drawing Sheets

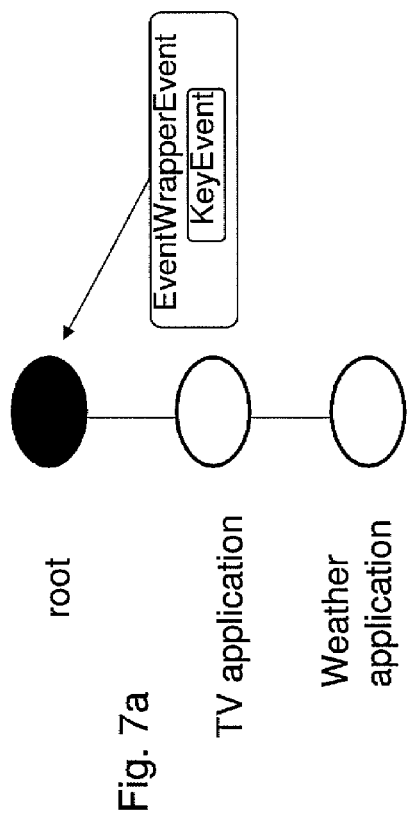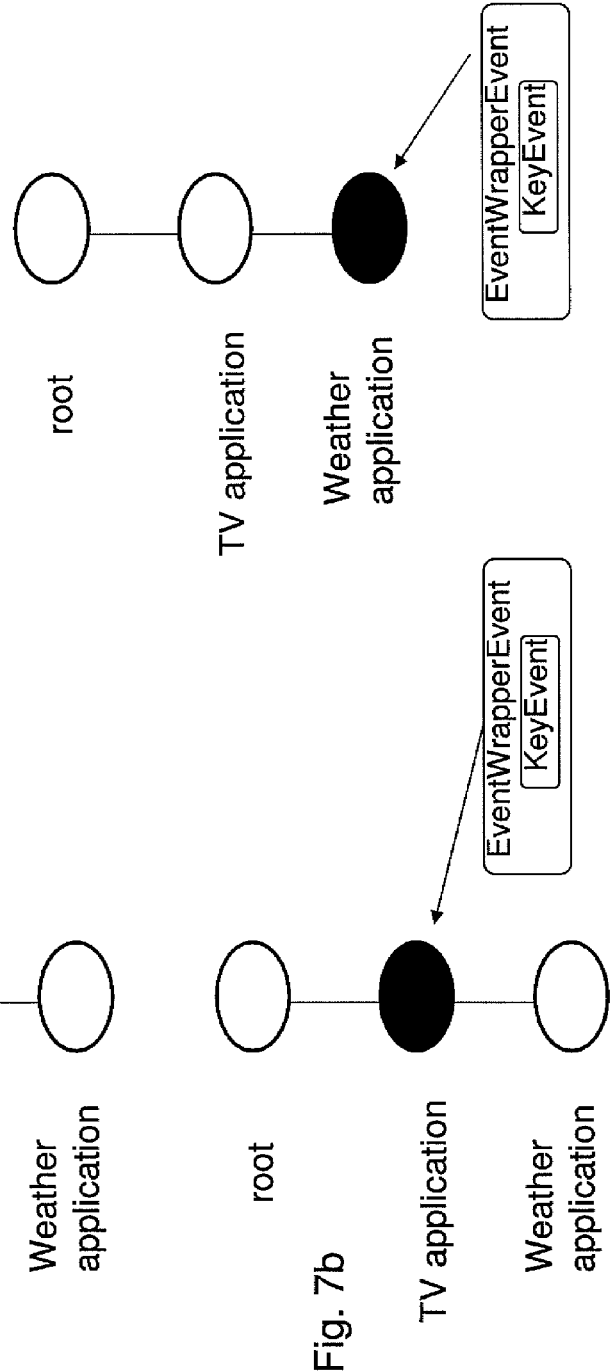

METHOD AND ARRANGEMENT IN AN IPTV TERMINAL

RELATED APPLICATION

This application claims the benefit of U.S. Provisional Patent Application 61/322,444 filed Apr. 9, 2010, which is incorporated herein by reference.

TECHNICAL FIELD

The embodiments of the present invention relates to event management in an IPTV (Internet Protocol Television) terminal, and in particular to the processing of the events by the applications which are available in the IPTV device.

BACKGROUND

The demands on IPTV providers to provide an extensible solution are increasing, where the end users are not restricted to a limited feature set, but are able to download and run new applications in conjunction with the traditional TV services.

For web applications used in IPTV solutions, the main existing technology is W3C Widgets, which defines a packaging and delivery method for web applications, a.k.a. widgets, together with a mechanism to sign widgets.

An application framework runs on the client side and is responsible for loading, managing and layout of the widgets. The W3C (World Wide Web Consortium) widget specifications do not define an application/widget framework in which the widgets execute. Instead different market segments have defined their own application managers for widget execution suitable for their specific segment.

In traditional application models, the application that is on top of the display stack is the focused application and receives the input events from the user. This can, for example, be seen on a windows based PC; applications (programs) are displayed to the user in rectangular areas on the PC desktop. The application that is displayed on top is the focused application and thus receives all input events, e.g. key and mouse events.

In an application model suited for IPTV, the requirements are slightly different. Applications are expected to be laid out in a similar way but it is not desired that the topmost application always receive all input events. Consider, for example, an application which displays a broadcasted TV channel, displayed full screen on the TV. On top of this application is a weather widget displayed in a small area of the screen. The weather widget reacts to left/right key presses when in focus but even when it is in focus the underlying broadcast application must be able to react to up/down key presses since they are used for channel zapping and the user expects channel zapping to always work.

SUMMARY

It is therefore desired to achieve event interception suitable for IPTV solutions which implies that other applications than the focused application is allowed to intercept an event.

To achieve an event interception suitable for IPTV solutions, the embodiments of the present invention introduces the concept of allowing other applications than the focused application to intercept an event.

The event interception is achieved by event wrapping according to embodiments of the present invention. The application framework may use a DOM based model for structuring all applications in the framework. This DOM based model uses a DOM Events based model in order to process events throughout the event model. Since a specific event, e.g. a key press event, in an IPTV solution always is targeted a specific application which may not be the focused application, the specific event has to be recognizable by the targeted specific application but still be processable as a normal event. In order to achieve this, the event wrapping is introduced according to embodiments of the present invention. When an event that is targeted a specific application takes place in the application model, the application manager wraps the event in an eventWrapper structure and dispatches it through the event model. When it reaches the targeted specific application, it is unwrapped and the original event is dispatched on the target as further explained.

The specific application recognizes events that are intended for said specific application and the recognized events should therefore not proceed to the focused application as in prior art.

By introducing event wrapping, the DOM Event Model is extended to work in a multi-document (i.e. multi-application) scenario. This means all the common practices from DOM events also become useful in a multi-application environment. These practices are both very useful to an application environment from a feature perspective (ability for applications to control what types of events their child applications are allowed to process, ability for multiple applications to share events, etc) and from an implementation perspective (web technology user agents, like browsers, already contain support for DOM events and may reuse this when supporting an application framework).

The aim with the embodiments of the present invention is thus to enable an event to be processed by an application even if the application is not the focused application.

This is achieved according to a first aspect by a method in a web engine configured for an ITF comprising an application framework associated with an API enabling display of applications is provided. In the method, at least two applications are stored, wherein the applications are arranged in a hierarchical tree structure in relation to each other. An event targeting at least one application, also referred to as a target application, is received. The method further comprises control of dispatch of the received event targeting at least one application. This implies that applications not being the focused application can receive and process an event. The controlling further comprises dispatching the received event to a target application and determining for each application if the event should be processed by the current application and if it should be processed, then the method comprises processing the event for the current application and if it should not be processed then the method comprises dispatching the event to a subsequent application in the hierarchical tree structure.

According to one embodiment, the controlling further comprises wrapping the event before the dispatching and the event is then unwrapped before the processing.

According to one embodiment of the present invention, the determining for each application if the wrapped event should be processed by the current application is performed by inspecting the wrapped event and checking if the event is applicable on the current application. Alternatively, the determining is performed by the application manager.

The aim of the embodiments is further achieved according to a second aspect by a web engine configured for an ITF comprising an application framework associated with an API enabling display of applications. The application framework comprises a memory for storing at least two applications, wherein the applications are arranged in a hierarchical tree structure in relation to each other. The application manager comprises a receiver for receiving an event targeting the at least one application, and a controller for controlling dispatching of events targeting the at least one application. The application manager further comprises a dispatcher for dispatching the received event towards a target application and the controller is further configured to determine for each application if the received event should be processed by the current application.

According to an embodiment of the present invention, the controller comprises an event wrapper for wrapping and unwrapping the received event.

According to a further embodiment, the controller is further configured to inspect the event and to check if the event is applicable on the current application to determine if the event should be processed by the current application. Alternatively, the application manager is further configured to store information of which application that is the target application for the events.

Further, in accordance with an embodiment, the application framework is configured to use a Document Object Model, DOM, based model for structuring the applications and the ITF may be any of a set-top-box, mobile terminal, or a PC.

An advantage with the embodiments of the present invention is that it allows greater flexibility in the co-existence between applications than what's available in existing application frameworks. This flexibility is crucial in an IPTV application environment.

BRIEF DESCRIPTION OF THE DRAWINGS

FIG. 7 illustrates the event wrapping according to the embodiments of the present invention.

DETAILED DESCRIPTION

Figure 1:
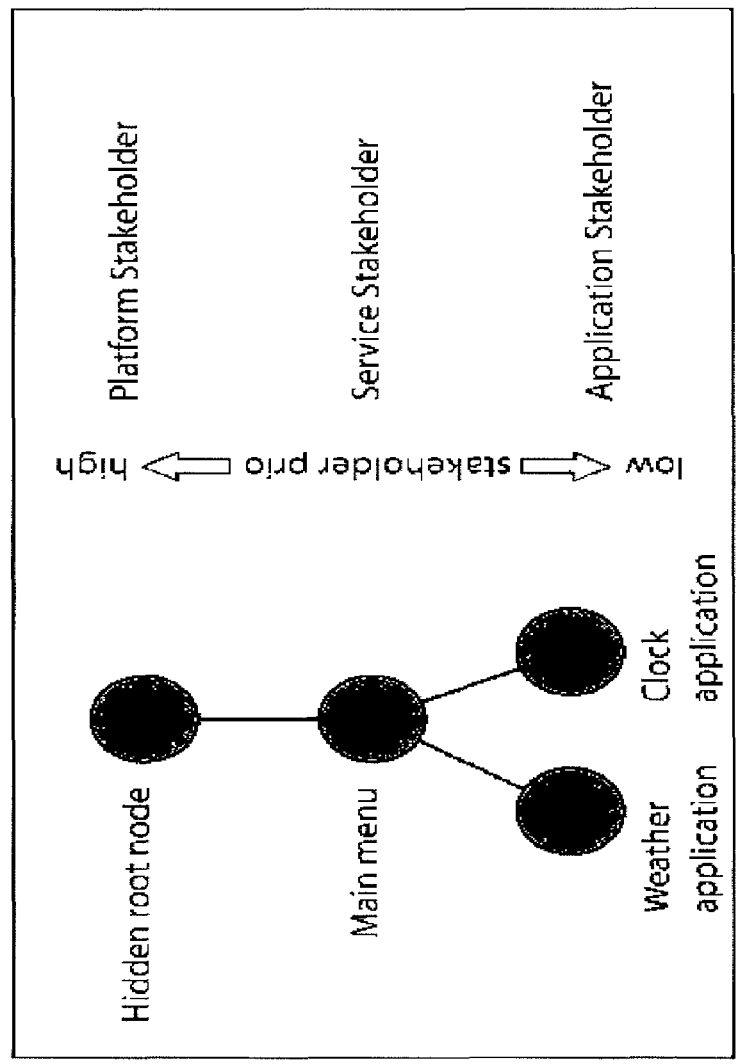
FIG. 1 illustrates an example of the application model and stakeholder priorities according to embodiments of the present invention.

The embodiments of the present invention will be described more fully hereinafter with reference to the accompanying drawings, in which embodiments of the invention are shown. The embodiments of the present invention may, however, be embodied in many different forms and should not be construed as limited to the embodiments set forth herein; rather, these embodiments are provided so that this disclosure will be thorough and complete, and will fully convey the scope of the present invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

The embodiments of the present invention define an application framework applicable for both W3C Widgets and web applications in general. Further, the embodiments of the present invention are designed to be easily extensible for future requirements and could also be used for other environments than the TV environment.

The OIPF (Open IPTV Forum) DAE (Declarative Application Environment) specification v.1.1 specification contains a definition of an application manager and a corresponding application model. There is also an ongoing work item in OIPF to add W3C Widget support to the DAE application model. The embodiments of the present invention align partly with the DAE application model. However, a main difference can be noted:

The application manager in DAE only exposes a flat list of the applications. However, in the embodiments of the present invention, the applications are arranged in a hierarchical tree model and the tree model is directly exposed to the applications. This implies that the embodiments align with the DOM (Document Object Model) model, which each user agent already supports, and that it also makes it possible to use a DOM based event model for applications which are both powerful and compatible with existing web standards. The DOM is a cross-platform and language-independent convention for representing and interacting with objects in HTML, XHTML and XML documents. Aspects of the DOM (such as its "Elements") may be addressed and manipulated within the syntax of the programming language in use. The public interface of a DOM is specified in its Application Programming Interface (API).

TERMS AND DEFINITIONS

An application programming interface (API) is an interface implemented by a software program to enable interaction with other software, similar to the way a user interface facilitates interaction between humans and computers. APIs are implemented by applications, libraries and operating systems to determine the vocabulary and calling conventions the programmer should employ to use their services. It may include specifications for routines, data structures, object classes, protocols used to communicate between the consumer and implementer of the API interfaces that enables web applications to reach natively implemented functionality on the platform.

A web engine is the native component in which web applications execute. A web browser is a typical example of a web engine.

The Application framework is the entire client side environment for managing and displaying web applications and widgets. Hence, a web application is typically considered to comprise a DOM based markup format in combination with a browser supported language, typically one SVG or HTML document/file together with JavaScript code. Further, in software engineering, a web application is an application that is accessed via a web browser over a network such as the Internet or an intranet. The term web application may also mean a computer software application that is hosted in a browser-controlled environment (e.g. a Java applet) or coded in a browser-supported language (such as JavaScript, combined with a browser-rendered markup language like HTML) and reliant on a common web browser to render the application executable.

A widget is defined in the W3C Widgets Family of Specifications. Basically a widget can be seen as a web application with a defined packaging scheme that may be downloaded and locally stored on the client side. Widgets are therefore suitable for both online and offline execution. In the scope of this description the widget definition is extended to state that a widget is a specialization of a web application, i.e. it has all the properties of a web application in conjunction with the W3C defined widget behavior. However a widget can be installed (locally stored) on the device without being loaded into the application framework whereas an application is directly loaded into the framework from a remote location (no way to locally store an application).

Note that although a widget, given its properties, is suitable for local storage (installation) in the UA (user agent), there is no requirement that a widget must be installed. The user agent may, e.g., have storage restrictions that prevent it from storing widgets locally but may still allow widgets to execute. In this sense, widgets would behave exactly as web applications but still be subject to widget specific properties.

An application, in the context of this specification, is considered to be a web application or widget that is managed by the Application Manager and adheres to the interfaces and mechanisms defined in this specification. Note that this specification is written in such a way so that a web application (e.g. a basic HTML page) or widget can function as an application without any modifications in the web application's/widget's markup or javascript code.

Hence, throughout this specification the term application is used for both web applications and widgets. The term widget is only used when it is specifically the widget specialization of an application that is discussed.

An application manager is the mechanism to control layout and management of applications. The application manager is controlled by the platform provider.

A User Agent (UA) is an implementation which also may be referred to as a widget user agent to the extent applicable by this specification. User agents in the IPTV segment are often referred to as ITFs (IPTV Terminating Functions); however, the more general term UA is used throughout this specification.

The different stakeholders are defined below and a model for stakeholder control is defined according to embodiments of the present invention. The model for stakeholder control which is illustrated in FIG. 1.

A platform stakeholder is the provider of the platform, typically the provider of a STB or TV equipment. The Platform Stakeholder has an interest in controlling applications in order to align application layout with the native user experience (UX) of the platform. As one example, a TV equipment provider X may desire to display available widgets in a menu aligned with the TV's native look and feel, independently of the service that might be running at a specific point in time.

A service stakeholder is the provider of a service, typically an operator providing TV services to its subscribers. The operator has an interest in providing his own UX (User Experience) of the services and hiding as much of the native UX as possible. This includes the ability to provide application control as an integrated part of the service UX. For example, TV Service provider Y may desire to display available widgets in a menu that is integrated in the service provider's portal.

An application stakeholder is the provider of a specific application. The application stakeholder may have an interest in controlling other applications from within himself, e.g., to display a list of applications from the same application provider.

The defined stakeholders are prioritized, in order from high to low, as follows: Platform stakeholder-Service stakeholder-Application stakeholder. Highest priority decides, i.e. if the platform stakeholder has decided that all applications shall be controlled through a platform controlled UI (user interface) there is no way for a service or application stakeholder to override this decision.

The basic mechanism to control the stakeholder priorities is through the application manager and the application model it controls. The stakeholders control the application manager and the application manager, in turn, controls all requests from applications regarding modifications of application properties and addition/invoking of other applications. Here a platform stakeholder has the opportunity to restrict the power of the other stakeholders since it controls the application manager. Furthermore, the application model has a tree structure and the root node is a platform controlled node where the platform stakeholder may add logic to restrict the other stakeholders' control, e.g., by stopping certain events from traversing the model. Similarly, the node under the root node is typically controlled by the service stakeholder and can thus contain similar logic to restrict the application stakeholder control.

The application model that is controlled by the application manager may be a normal DOM tree model where all nodes are applications. In this case, applications inherit subsets of the DOM3 (DOM Level 3 Core) Element, ElementTraversal and Node interfaces which enables the application model to be traversed and applications to be added and removed from it.

The root node in the tree is a hidden system node controlled by the application manager. It can never be removed or modified and all applications are added as children nodes to the hidden node. The root node could be a built in, native, widget bar for example. Or it could just be a non-visual application stopping certain events from going down in the model in order to block a certain functionality from being used by all widgets, e.g., turning off the TV.

Figure 3:
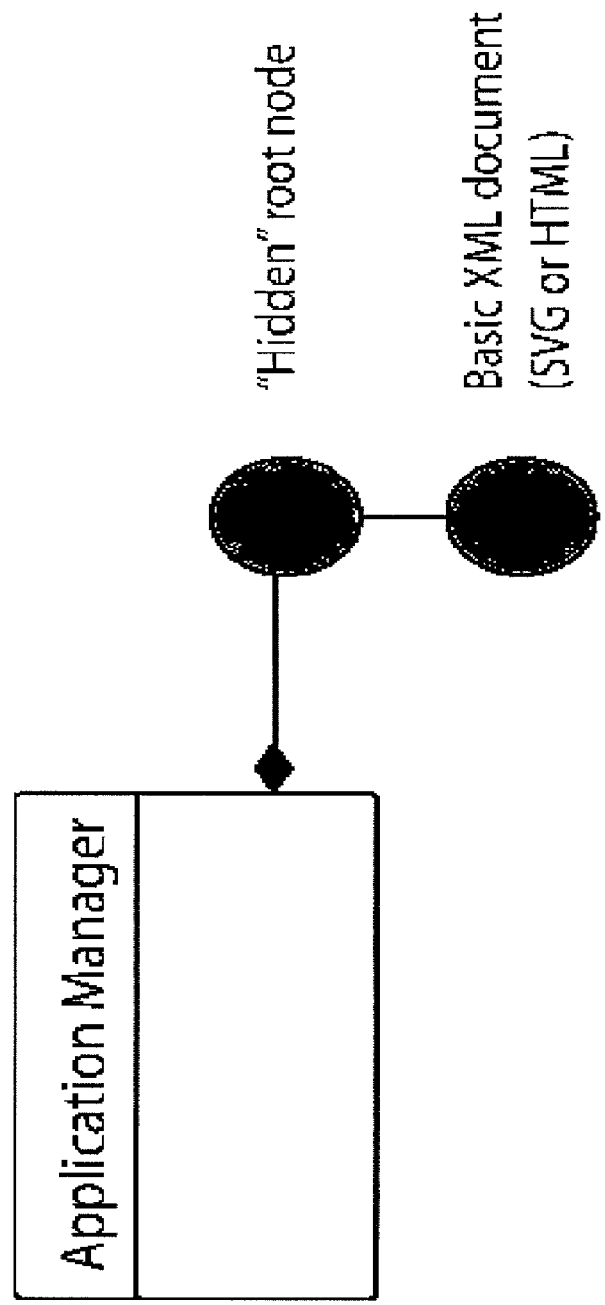
FIG. 3 illustrates the application model when a single file/document is loaded in the application manager according to embodiments of the present invention.

In the case of a single web application, e.g., a plain SVG file, being displayed by the UA, the model would look as illustrated in FIG. 3 which shows the application model when a single file/document is loaded in the application manager.

Each application, except the root application, in the application framework has an associated Document object. The document represents the DOM of the specific application and is independent of any other application in the model, i.e., applications have a separate DOM which runs in a separate script context.

Figure 4:
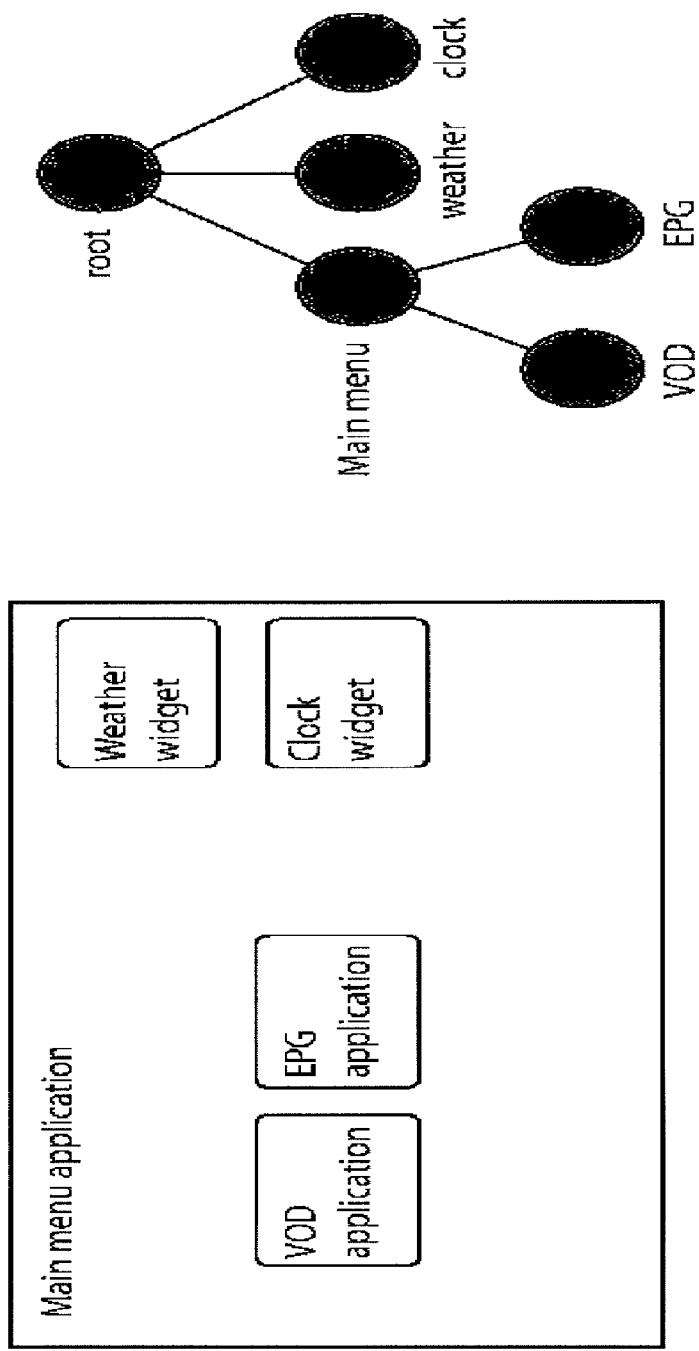
FIG. 4 illustrates to the right the application model when multiple applications are loaded in the application manager and to the left a possible visualization of the application model according to embodiments of the present invention.

An example of a larger application tree is illustrated in FIG. 4 which shows the application model (to the right) when multiple applications are loaded in the application manager. The figure to the left illustrates how the applications may be displayed on the screen. The child nodes can inherit properties from its parent node. For example, if a parent is removed, the child is removed but other properties could be considered for upcoming versions, like transparency for example. If the user can say that an application shall be semi-transparent, the child applications should also be semi-transparent.

The application manager according to the embodiment of the present invention may use an event model based on the DOM 2 event model.

One and only one node in the DOM tree is the target of input events (key events, mouse events, ...) at a specific point in time. This means that an event such as a key input will go to the target application but, before doing that, it will pass by all the parents (ancestors) of the target node from the top down to the target application. This is called the capture phase. In accordance with embodiments of the present invention each passing node may capture, i.e. stop the event. Once the event has reached the target application, the target application can either capture, i.e. stop, the event or let it pass up by the same nodes again, which is called the bubble phase. The capturing and the bubble phase are part of the DOM event model.

In contrast to the prior art solutions where the event target always is the currently focused application, the embodiments of the present invention introduce a model where the target application can be any application independently of which application that is the currently focused application. However, both the capture and bubble phases of DOM2 are supported by the embodiments of the present invention.

According to the DOM2 event model the event starts from the root and traverses the tree towards the target application during the capture phase. By using the hierarchical model each passing application may capture the event if the application is the target application independently of whether the application is the focused application in accordance with embodiments of the present invention. When the event reaches the target application, it is processed by the target application. If the target application does not capture the event, the event traverses the tree up to the root again which is referred to as the bubble phase. Each passing application may stop (i.e. capture) the event from further bubbling.

Figure 5:
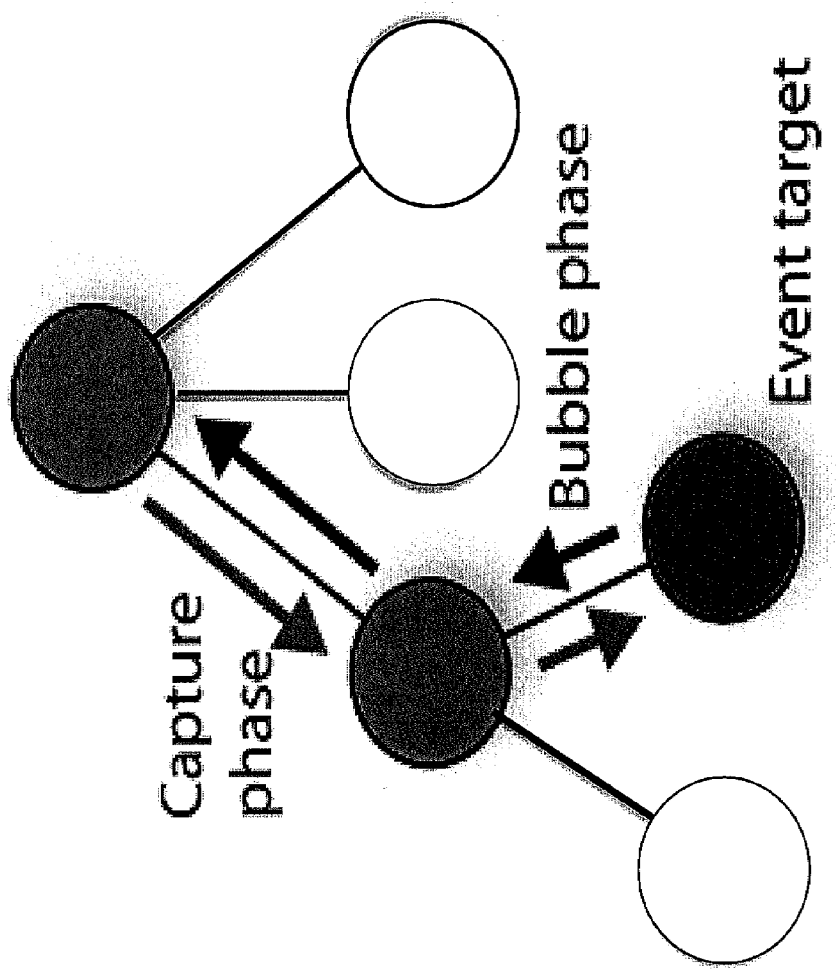
FIG. 5 illustrates the DOM capture bubble phase in an application model according to embodiments of the present invention.

FIG. 5 illustrates the DOM2 capture/bubble phases where an event traverses towards the target application referred to as the event target.

Figure 2:
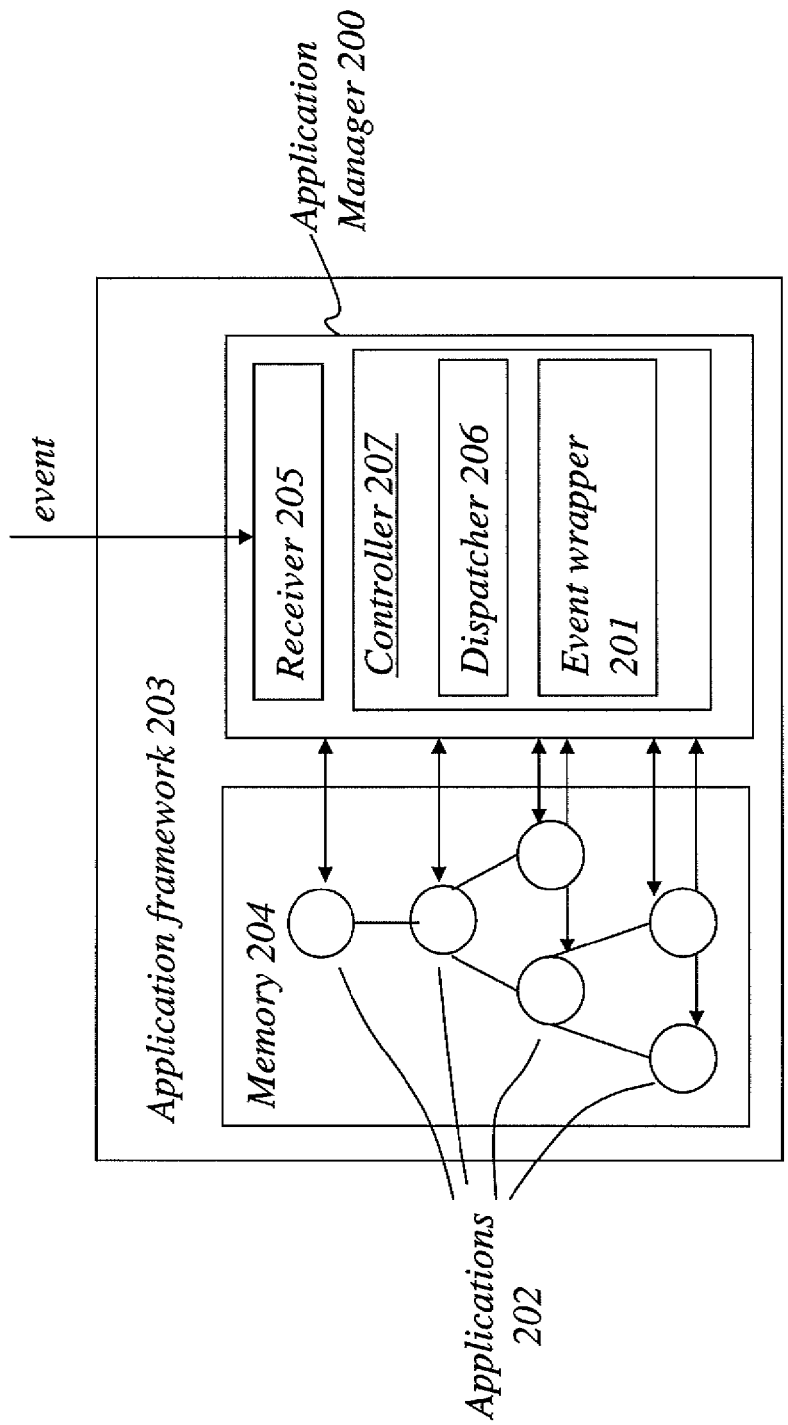
FIG. 2 illustrates an application framework according to embodiments of the present invention.

In order to enable any application, independently of which application that is the focused application, to be the target application, the hierarchical application model is combined with an event wrapper. The application manager comprises the event wrapper and the event wrapper is configured to wrap an event that should be traversed towards the target application. The wrapped event is hence traversed through the tree of applications. Each application is configured to inspect the wrapped event in order to check if the current application should process the event. If the current application determines that it is the target application, the application manager unwraps the event and the current application receives the unwrapped event and processes the unwrapped event as a normal event. If the current application determines that it is not the target application, the application manager dispatches the wrapped event to a subsequent application in the tree. FIG. 2 illustrates an application framework 203 according to an embodiment of the present invention. The application framework 203 comprises the application manager 200 and a memory 204 storing the applications 202 arranged in a hierarchical order. Further, the application manager 200 comprises a receiver 205 configured to receive an event and a controller 207 configured to control the dispatching. The controller 207 controls the dispatching by the dispatcher 206 and comprises further an event wrapper 201. Since the application manager controls the applications 202, the application manager 200 is aware of whether it should unwrap the wrapped event, or if it should dispatch the wrapped event to a subsequent application.

All applications that are ancestors of the target application can register to listen to the event by adding an event listener on the document node of the application to listen to the eventWrapper event. Thus, in order for any web application to receive an event, it must register a listener for that event. If the user clicks on an application with the mouse but the application has not registered a mouse event listener, nothing will happen. The same applies for the eventWrapper event. The eventWrapper event is a special event performed by the event wrapper 201 that wraps the actual event on its way through the application tree.

When the eventWrapper event reaches the target application, i.e. the event is unwrapped, the wrapped event is dispatched on the document associated with the target application just as it would have been in a single-document environment. The unwrapped event is processed in the normal way by the document. When leaving the document, if not captured, it's again wrapped in the eventWrapper event and starts to bubble up the application tree.

The event wrapping is exemplified by the following example:

1. The application manager 200 receives an event (e) (e.g. key '1') via the receiver 205 by the system. The event is targeted to one of the applications 202 stored in the memory 204 in the framework 203.
2. The event wrapper 201 of the application manager 200 creates an eventWrapper event (ew) and wraps the event.
3. The application manager 200 passes the wrapped event down the model tree towards the target application. The wrapped event is inspected by each application 202 it passes in order to check whether the wrapped event is applicable to the current application. If the wrapped event is applicable to the current application, that would imply that the current application is the target application.
4. When the wrapped event reaches the target application, the application manager 200 unwraps the event and dispatches the unwrapped event on the target application.
5. If the event is not captured by the target application, the application manager puts the event back in the event wrapper and bubbles the wrapped event containing the real event up the model. This is applicable to cases when the application does not care if other applications process the event. Hence, if the application does not care if other applications use the event it should not capture it.

Figure 6:
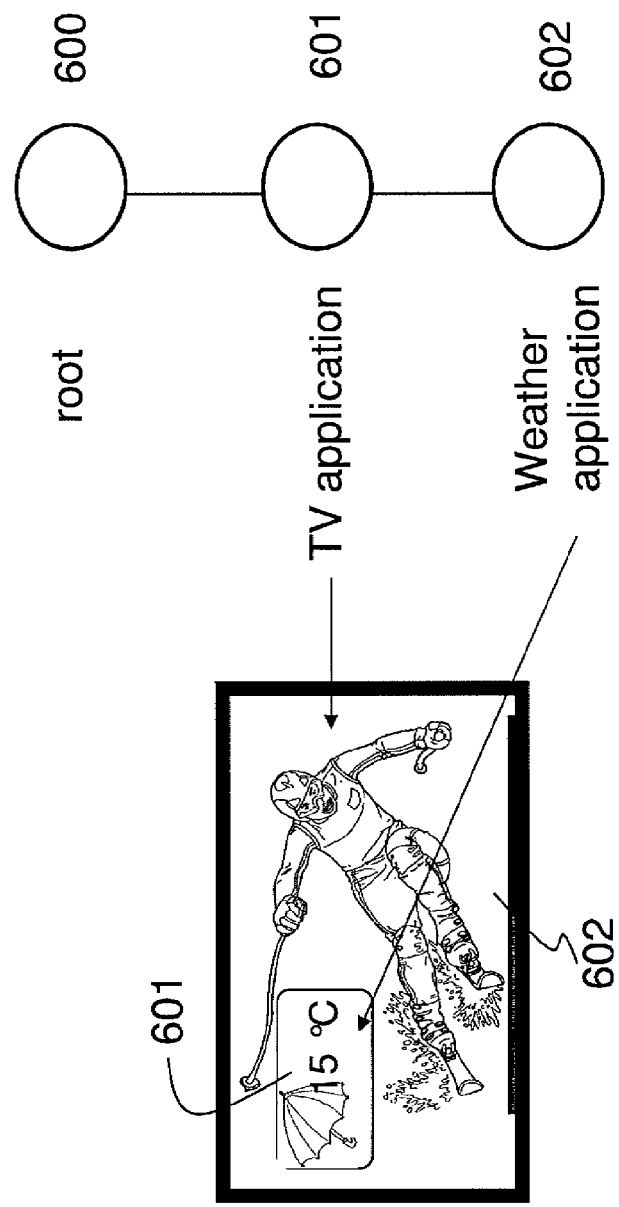
FIG. 6 illustrates a TV application displaying a broadcasted Tv channel.

This behavior is further exemplified below and in conjunction with FIG. 6.

Consider a TV application 601 which displays a broadcasted TV channel. A weather widget 602 is displayed on top of the TV application 601 and the weather widget 602 has focus. When the weather widget has focus, the weather widget listens for left/right key presses which are used to navigate between forecasts for different days.

Even though the weather widget has focus, the TV application would like to allow the user to change channel with the normal key up/down. Since the applications are arranged in a hierarchical model according to embodiments of the present invention, other applications than the focused application can process an event. In this case, the weather widget was added by the TV application and is a child of the TV application. Hence the TV application is the parent of the weather widget all events will pass by the TV application during the capture phase on the way down to the weather widget. Accordingly, the TV application will check if the event is a key press up or down. If that is true, then the TV application will process the event, otherwise the application manager will dispatch the event further to the weather widget.

As explained above, the application manager wraps the event and dispatches the event through the hierarchical tree model. The wrapped event comprises information of the target application. At each application which the wrapped event passes, the current application inspects the wrapped event to determine if the event should be processed by the current application. If the current application should process the event, which implies that the current application is the target application, the application manager is informed and unwraps the event such that the application can process the event as a normal event. In the application, it is defined how the application should process an event. This is exemplified by the code examples below:

```
TV application:
    <html id="tvApplication">
        <video id="broadcastChannel" src="dvb://..."/>
        <script type="text/javascript">
            var appManager =
            oipfObjectFactory.createApplicationManagerObject( );
            document.addEventListener("eventWrapper", capturer,
            true);
            function capturer(evt) {
                //if the event is a key press up/down the TV
                Application
                //will change channel and then stop the event. It will
                //therefore never reach the weather widget.
                if (evt.event.type == "keydown") {
                    if (evt.event.keyIdentifier == "Up" ||
                        evt.event.keyIdentifier == "Down") {
                            changeChannel(evt.event.keyIdentifier);
                            evt.stopPropagation( );
                    }
                }
            }
        </script>
    </html>
Weather application:
    <html id="WeatherWidget">
        <div id="content">
            <!--weather symbols etc ...-->
        </div>
        <script type="text/javascript">
            var e = document.getElementById("content");
            e.addEventListener("keydown", keyPress, false);
            function keyPress(evt) {
                if (evt.keyIdentifier == "Left") {
                    changeToPrevDay( );
                    evt.stopPropagation( );
                }
                else if (evt.keyIdentifier == "Right") {
                    changeToNextDay( );
                    evt.stopPropagation( );
                }
            }
        </script>
    </html>
```

As mentioned above, when an input event such as a key event, takes place in the UA the event wrapper of the application manager wraps the event by an eventWrapper event and sends it down the application tree as illustrated in the FIGS. 7a and 7b.

In the example illustrated in FIGS. 7a-7c, the first stop is the hidden root node of the application tree as shown in FIG. 7a. Here the platform stakeholder has the opportunity to process and capture specific events if he so wishes. For example, a specific key may always be associated with a native platform menu and should never be used for anything else. This key would be captured in the root node.

From the root node, the wrapped event moves down the tree towards the target controlled by the application manager as illustrated in FIG. 7b. The next stop is the TV application node. Here the TV application will examine the key event according to the code example above and stop the event if the event relates to a channel change event.

If the event instead relates to management of the weather widget, the TV application will let the wrapped event pass. Its next stop is the actual event target, the weather application as shown in FIG. 7c.

At the target application, the application manager removes the wrapping event by unwrapping the event and dispatches the key event on the applicable application document. According to the code example above, the weather application would process and stop the event in the case of left/right keys. For all other cases, the event would not be stopped.

If the event is not stopped, the application manager unwraps the event in the eventWrapper event and lets it bubble up through the tree to complete the capture/bubble phase. Note that this last step is not illustrated in the picture to the right.

Figure 8:
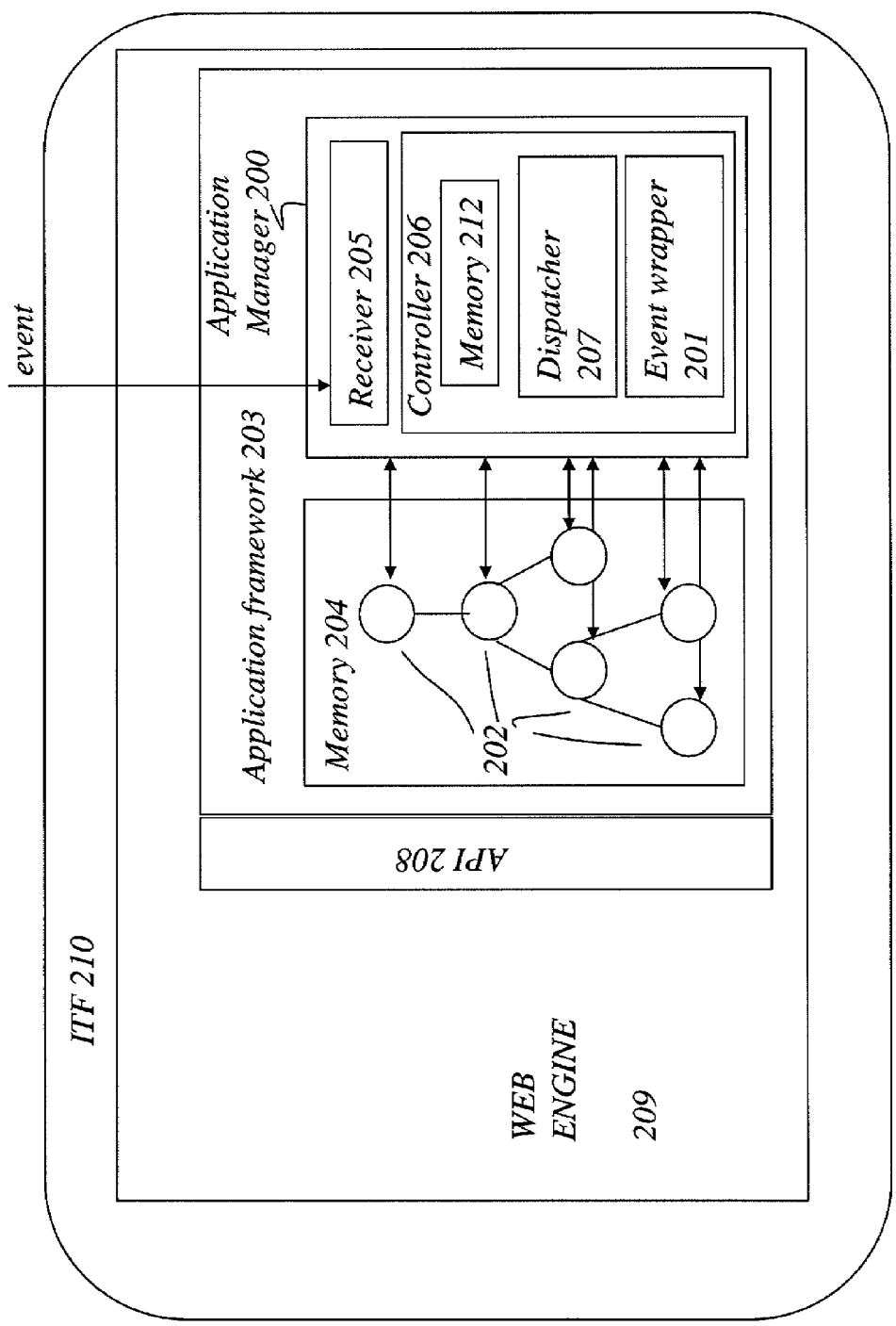
FIGS. 8 and 9 show an arrangement according to embodiments of the present invention.

According to a first embodiment of the present invention, a web engine is configured for an ITF (IPTV Terminal Function) 210, such as a STB (set-top-box), comprising an application framework 203 associated with an API enabling display of applications is provided as illustrated in FIG. 8. The application framework 203 comprises a memory 204 for storing at least two applications 202, wherein the applications 202 are arranged in a hierarchical tree structure in relation to each other and one of the at least two applications may be a focused application. The application framework 203 further comprises an application manager 200 comprising a receiving unit 205 for receiving the event, e.g. a key press, and a controller 207 for controlling the dispatching. According to one embodiment, the controller 207 comprises an event wrapper 201 for wrapping and unwrapping the event and a dispatcher 207 for transferring the wrapped event down through the application tree. For each application node (also the root node) the application manager 200 is configured to determine if an event should be processed by the current application by using the controller 206.

Hence the controller 206 of the application manager 200 controls the dispatch of the events. In accordance with an embodiment, the event wrapper 201 of the application manager 200 wraps an event and the dispatcher 207 dispatches the wrapped event to a target application. For each application, a current application may be configured to inspect the wrapped event whether the wrapped event should be processed by the current application or alternatively, the application manager may be configured to store information in a memory 212 of which application that is the target application for the events. If the wrapped event should be processed by the current application, the event wrapper 201 of the application manager 200 unwraps the event for the current application such that the event can be processed as a normal event by the current application. If the event should not be processed by the current application, the application manager 200 dispatches the wrapped event to a subsequent application.

Figure 9:
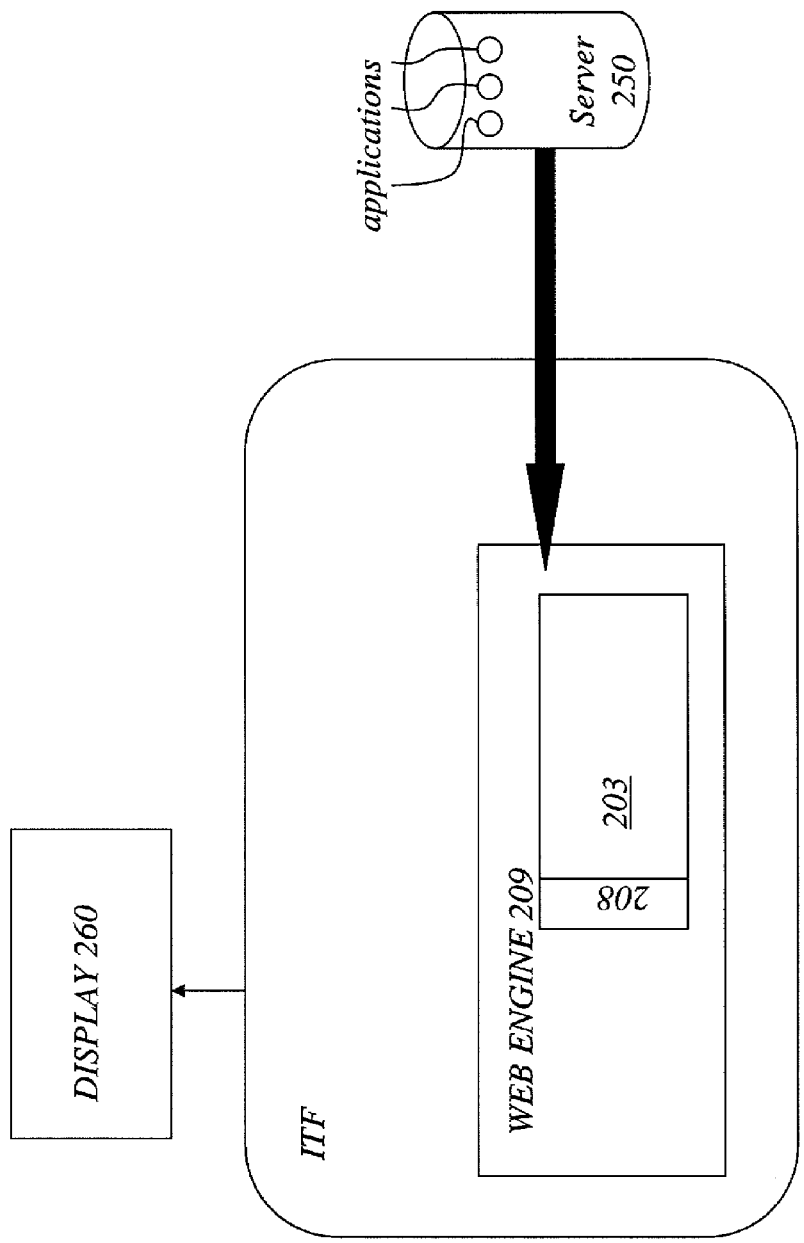

The ITF 210 can retrieve the applications 202 from a server 250 and by using the API 208. The application can be displayed on a screen 260 as illustrated in FIG. 9. It should also be noted that a typical web engine comprises other components such as HTML (HyperText Markup Language) model and XML (eXtensible Markup Language) parser but that is not within the scope of the present invention.

The application manager may be implemented by one or more processors comprising software and/or hardware portions for carrying out the functions of the application manager and the receiver 205, controller 207, dispatcher 206 and the event wrapper 201.

Figure 10:
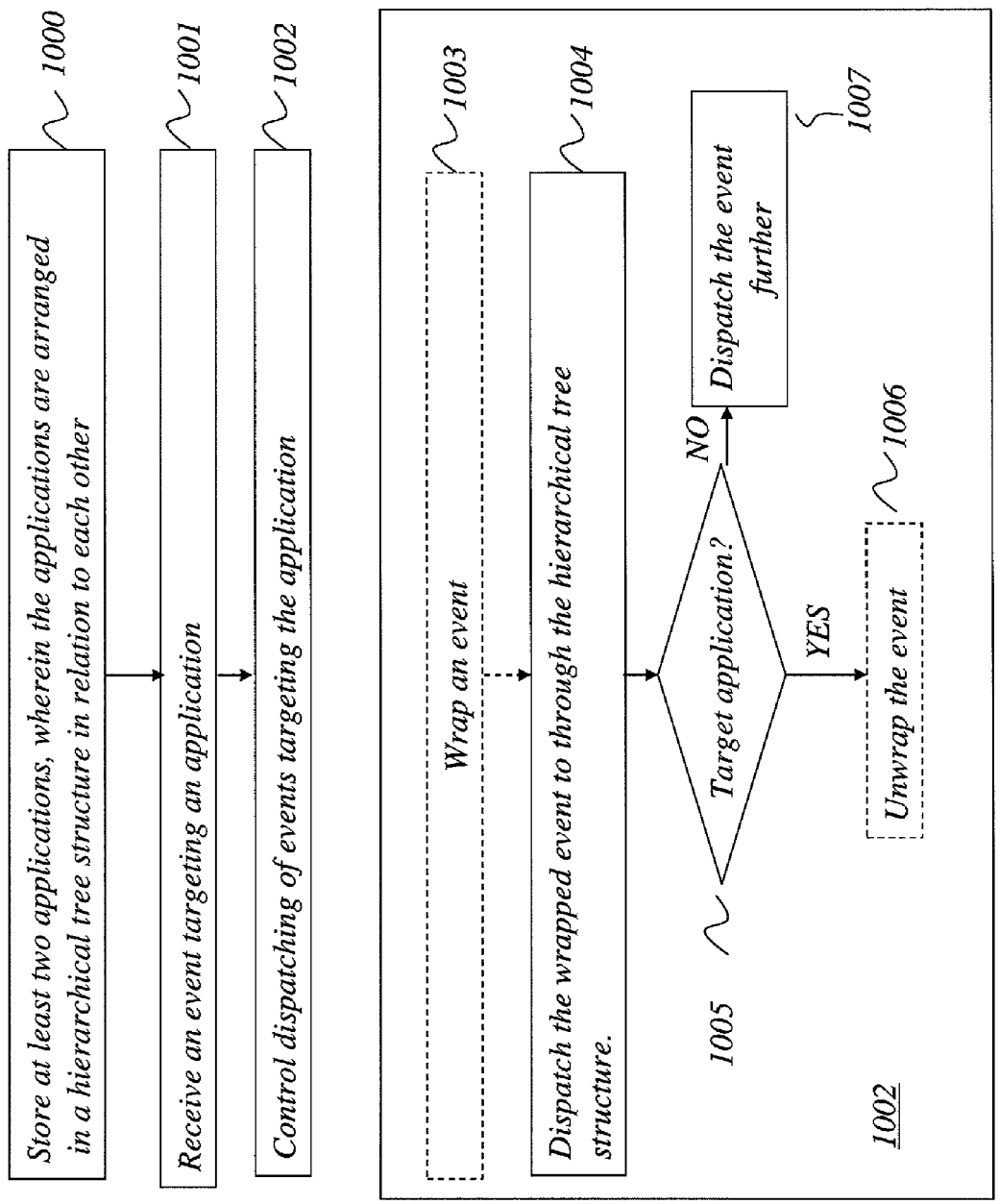
FIG. 10 is a flowchart of an embodiment of the present invention.

According to a second embodiment of the present invention, a method in a web engine is provided as illustrated in FIG. 10. The web engine is configured for an ITF comprising an application framework associated with an API enabling display of applications. The method comprises storing 1000 at least two applications, wherein the applications are arranged in a hierarchical tree structure in relation to each other and one of the at least two applications is a focused application, receiving 1001 an event and controlling 1002 dispatching of the event targeting at least one application such that applications not being the focused application can receive and process an event.

The dispatch of the event is controlled by using the application manager, wherein the application manager may comprise an event wrapper wrapping and unwrapping the events. The method comprises the further steps of wrapping 1003 an event and dispatching 1004 the wrapped event to a target application according to an embodiment of the present invention.

For each application, it is determined whether the current application is the target application. This can be done by configuring the current application to inspect the wrapped event or by letting the application manager store information in a memory 212 of which application that is the target application for a certain event. If the current application is the target application and, accordingly, if the wrapped event should be processed by the current application 1005, the method comprises unwrapping 1006 the event for the current application such that the event can be processed as a normal event by the current application. If the event should not be processed by the current application, the application manager dispatches 1007 the wrapped event to a subsequent application.

The hierarchical application model of the present invention allows a new application to be included. The inclusion of the new application may be achieved by the following steps:

1. The user requests a new application, by calling loadApplication or installWidget+loadApplication for widgets.
2. The request is handled by the API of the application manager 200.
3. The request is sent to a server 250 managed by the service provider or another content provider.
4. The server responds to the request by sending the application to the web engine 209 by using a normal HTTP GET. If the server 250 cannot provide the application, nothing will be retrieved.
5. The application manager 200 includes the new application into the tree structure. When the new application is added to the tree it is automatically displayed.

The embodiments of the present invention are not limited to the above-described preferred embodiments. Various alternatives, modifications and equivalents may be used. Therefore, the above embodiments should not be taken as limiting the scope of the invention, which is defined by the appending claims.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method in a web engine configured for an Internet Protocol Television (IPTV) Terminal Function comprising an application framework associated with an Application Programming Interface enabling display of applications, the method comprising:
   storing at least two applications, wherein the applications are arranged in a hierarchical Document Object Model (DOM) tree model in relation to each other and include a root node application;
   receiving an event targeting at least one application, and dispatching the received event to a target application by sending the event through the hierarchical tree model towards the targeted application-beginning with the root node application;
   determining for each current application traversed by the event if the event should be processed by the current application;
      if it is determined that the event should be processed by the current application, processing the event for the current application; and
      if it is determined that the event should not be processed by the current application, dispatching the event to a subsequent application in the hierarchical tree model.

2. The method according to claim 1, further comprising wrapping the event before the dispatching and wherein the event is unwrapped before the processing.

3. The method according to claim 1, wherein determining for each current application, if the event should be processed by the current application is performed by inspecting the event and checking if the event is applicable on the current application.

4. The method according to claim 1, wherein determining for each current application, if the event should be processed by the current application is performed by an application manager.

5. The method according to claim 1, wherein the IPTV Terminal Function is any of a set-top-box, mobile terminal, or a PC.

6. A computing device implementing an application framework for an Internet Protocol Television (IPTV) system enabling display of web applications on a display device, wherein said computing device comprising:
   memory having two or more applications organized in a hierarchical Document Object Model (DOM) tree model and include a root node application; and
   an application manager to receive an events targeting one of said applications in said hierarchical tree model, said application manager comprising a controller for dispatching the received event by sending it through the hierarchical tree model towards the targeted application beginning with the root node application, said controller configured to: determine whether a first application in said hierarchical tree model traversed by the received event is the targeted application; and
   dispatch the received event to a second application in said hierarchical tree model if the first application is not the targeted application.

7. The computing device of claim 6 wherein the controller further comprises an event wrapper for wrapping and unwrapping events.

8. The computing device of claim 6 wherein the controller stores information indicating the target application for the event.

9. The computing device of claim 6 wherein the computing device is incorporated in a set-top box, mobile terminal, or personal computer.

\* \* \* \* \*